United States Patent Office 2,974,170
Patented Mar. 7, 1961

2,974,170

PREPARATION OF NUCLEARLY UNSATURATED IONONES AND INTERMEDIATES THEREFOR

Walter Kimel, Highland Park, N.J., assignor to Hoffmann-La Roche Inc., Nutley, N.J., a corporation of New Jersey No Drawing. Filed Jan. 16, 1959, Ser. No. 787,099

6 Claims. (Cl. 260—587)

This invention relates to novel chemical processes, and to novel compounds useful in carrying out such processes. More particularly, the invention relates to novel methods of preparing nuclearly unsaturated ionones by cyclization of two novel compounds, viz. 6,10-dimethyl-4,6,9-undecatrien-2-one and 6,9,10-trimethyl-4,6,9-undecatrien-2-one. Illustrative of the nuclearly unsaturated ionones which are produced by the processes of the invention are the well known compounds of α-ionone and α-ione.

In one of its specific embodiments, the invention provides a method for the preparation of α-ionone which comprises treating 6,10-dimethyl-4,6,9,-undecatrien-2-one with an acidic cyclizing agent.

In another of its specific embodiments, the invention provides a method for the preparation of α-irone which comprises treating 6,9,10-trimethyl-4,6,9-undecatrien-2-one with an acidic cyclizing agent.

In still another of its specific embodiments, the invention provides the novel starting material 6,10-dimethyl-4,6,9-undecatrien-2-one, and a method of making the same from 2-acetoxy-6,10-dimethyl-2,4,6,9-undecatetraene.

In still another of its specific embodiments, the invention provides the novel starting material 6,9,10-trimethyl-4,6,9-undecatrien-2-one, and a method of making the same from 2-acetoxy-6,9,10-trimethyl-2,4,6,9-undecatetraene.

The compounds 2-acetoxy-6,10-dimethyl-2,4,6,9-undecatetraene and 2-acetoxy-6,9,10-trimethyl-2,4,6,9-undecatetraene, above mentioned, and the preparation thereof, are not claimed as part of the present invention; but the following description of this subject matter is included herein, in order that the claimed invention may be completely understood:

A mixture of pseudoionone (192.3 g.), isopropenyl acetate (200 g.) and p-toluene-sulfonic acid (1 g.) was heated to reflux in a flask connected to a fractionation column. Acetone was removed slowly until the distillation temperature reached 82° C. The reaction mixture was then cooled to room temperature, and was washed with aqueous sodium bicarbonate solution and water until neutral. Finally, the product was isolated by distillation. 2-acetoxy-6,10-dimethyl-2,4,6,9-undecatetraene was obtained in yield of 148 g. (63%); B.P. 112–115° C. (0.2–0.25 mm.); $n_D^{25}$ 1.532–1.537.

2-acetoxy-6,9,10-trimethyl-2,4,6,9-undecatetraene was prepared from pseudoirone (412 g.), isopropenyl acetate (400 g.) and p-toluene-sulfonic acid (2 g.) in the same manner described above for preparation of 2-acetoxy-6,10-dimethyl-2,4,6,9-undecatetraene. The product was obtained in yield of 316 g. (62%); B.P. 114–119° C. (0.2 mm.); $n_D^{25}$ 1.530–1.537.

The starting materials employed in the processes of this invention, viz. 6,10-dimethyl-4,6,9-undecatrien-2-one and 6,9,10-trimethyl-4,6,9-undecatrien-2-one, can be prepared by hydrolysis of 2-acetoxy-6,10-dimethyl-2,4,6,9-undecatetraene and 2-acetoxy-6,9,10-trimethyl-2,4,6,9-undecatetraene, respectively, using such hydrolysis reagents as furnish low concentrations of hydrogen ions or hydroxyl ions, e.g. dilute aqueous sodium carbonate solutions, dilute aqueous sodium bicarbonate solutions, dilute aqueous sodium hydroxide solutions, dilute methanolic sodium hydroxide solutions, dilute aqueous calcium hydroxide solutions, dilute aqueous hydrochloric acid solutions, dilute aqueous sulfuric acid solutions, dilute ethanolic hydrogen chloride solutions and the like.

The nuclearly unsaturated products of the invention are made, on the other hand, by treating the compounds 6,10-dimethyl-4,6,9-undecatrien-2-one and 6,9,10-trimethyl-4,6,9-undecatrien-2-one, respectively, with such acidic cyclizing agents as furnish a high proton concentration. Exemplary of suitable acidic cyclizing agents are syrupy phosphoric acid and aqueous sulfuric acid having a concentration from about 60% by weight to about 85% by weight, in the presence of a saturated liquid hydrocarbon of aliphatic nature, such as hexene or heptane, cf. U.S. Patent No. 2,877,271, issued March 10, 1959.

The invention is further disclosed in the following examples, which are illustrative but not limitative thereof. Temperatures are stated in degrees centigrade.

*Example 1*

A mixture of 2-acetoxy-6,10-dimethyl-2,4,6,9-undecatetraene (136.8 g.), sodium bicarbonate (46.7 g.), methanol (1170 cc.) and water (170 cc.) was heated to reflux for five hours. Then, the mixture was diluted with 10 liters of cold water, and was extracted with petroleum ether. The extract was washed neutral, dried with calcium sulfate and distilled. There was obtained 73 g. (65%) of a product consisting essentially of 6,10-dimethyl-4,6,9-undecatrien-2-one; B.P. 97–100° (0.25 mm.); $n_D^{25}$ 1.510–1.518.

*Example 2*

To 85% phosphoric acid (72cc.), cooled to 0°, was added, dropwise, 6,10-dimethyl-4,6,9-undecatrien-2-one (30 g.). The time of addition was 5 minutes. Stirring was continued for 20 minutes at 0°, and then for 15 minutes at 40°. Then, the mixture was poured into ice water, and extracted with ether. The ether layer was washed neutral, dried and fractionally distilled. The chief product was α-ionone; yield, 13.5 g. (45%); B.P. 79–81° (0.6 mm.); $n_D^{25}$ 1.497–1.500; having a 4-phenylsemicarbazone of M.P. 187°.

*Example 3*

Hydrolysis of 2-acetoxy-6,9,10-trimethyl-2,4,6,9-undecatetraene (147.7 g.) with sodium bicarbonate (47.7 g.) in methanol (1190 cc.) and water (119 cc.) in the manner described in Example 1, gave 82.4 g. (6.7%) of 6,9,10-trimethyl-4,6,9-undecatrien-2-one; B.P. 96° (0.2 mm.)–105° (0.5 mm.); $n_D^{25}$ 1.506–1.514.

*Example 4*

In the manner described in Example 2, 6,9,10-trimethyl-4,6,9-undecatrien-2-one (70.8 g.) was treated with 85% phosphoric acid (170 cc.). The chief product isolated was α-irone; yield, 38.7 g. (54%); B.P. 85–90° (0.6 mm.); $n_D^{25}$ 1.496–1.500; having a 4-phenylsemicarbazone of M.P. 172°.

I claim:

1. 6,10-dimethyl-4,6,9-undecatrien-2-one.

2. A method of making 6,10-dimethyl-4,6,9-undecatrien-2-one which comprises hydrolyzing 2-acetoxy-6,10-dimethyl-2,4,6,9-undecatetraene by treating the latter with a hydrolysis reagent selected from the group consisting of dilute aqueous sodium carbonate solutions, dilute aqueous sodium bicarbonate solutions, dilute aqueous sodium hydroxide solutions, dilute methanolic sodium hydroxide solutions, dilute aqueous calcium hydroxide solutions, dilute aqueous hydrochloric acid solutions, dilute aqueous sulfuric acid solutions and dilute ethanolic hydrogen chloride solutions.

3. 6,9,10-trimethyl-4,6,9-undecatrien-2-one.

4. A method of making 6,9,10-trimethyl-4,6,9-undecatrien-2-one which comprises hydrolyzing 2-acetoxy-6,9,10-trimethyl-2,4,6,9-undecatetraene by treating the latter with a hydrolysis reagent selected from the group consisting of dilute aqueous sodium carbonate solutions, dilute aqueous sodium bicarbonate solutions, dilute aqueous sodium hydroxide solutions, dilute methanolic sodium hydroxide solutions, dilute aqueous calcium hydroxide solutions, dilute aqueous hydrochloric acid solutions, dilute aqueous sulfuric acid solutions and dilute ethanolic hydrogen chloride solutions.

5. A method for the preparation of a nuclearly unsaturated ionone which comprises treating a compound selected from the group consisting of 6,10-dimethyl-4,6,9-undecatrien-2-one and 6,9,10-trimethyl-4,6,9-undecatrien-2-one with phosphoric acid.

6. A method for the preparation of a nuclearly unsaturated ionone which comprises treating a compound selected from the group consisting of 6,10-dimethyl-4,6,9-undecatrien-2-one and 6,9,10-trimethyl-4,6,9-undecatrien-2-one with aqueous sulfuric acid having a concentration from about 60% by weight to about 85% by weight $H_2SO_4$.

References Cited in the file of this patent

UNITED STATES PATENTS

| 2,506,473 | Steinberger | May 2, 1950 |
| 2,661,368 | Kimel et al. | Dec. 1, 1953 |

OTHER REFERENCES

Royals Ind. & Eng. Chem., vol. 38, pp. 546–8 (1946).